United States Patent [19]

Uyama et al.

[11] 3,846,383

[45] Nov. 5, 1974

[54] METHOD FOR PRODUCING COPOLYMERS

[75] Inventors: Fukuhito Uyama; Hisashi Tanaka; Sukenao Ito, all of Kurashiki, Japan

[73] Assignee: Kuraray Co., Ltd., Kurashiki City, Japan

[22] Filed: Aug. 17, 1973

[21] Appl. No.: 389,293

Related U.S. Application Data

[63] Continuation-in-part of Ser. No. 271,469, July 13, 1972, abandoned.

[52] U.S. Cl. .......................................... 260/78.5 R
[51] Int. Cl. ................................................ C08f 1/80
[58] Field of Search ................................ 260/78.5 R

[56] References Cited
UNITED STATES PATENTS

| | | | |
|---|---|---|---|
| 2,286,062 | 6/1942 | Condo et al. | 260/32 |
| 2,359,103 | 9/1944 | Gerhart et al. | 260/36 |
| 2,537,015 | 1/1951 | Barrett | 260/78.5 |
| 3,474,114 | 10/1969 | Kuhlkamp et al. | 260/347.3 |
| 3,558,570 | 1/1971 | Rinno et al. | 260/78.5 |
| 3,681,311 | 8/1972 | Patron et al. | 260/85.5 |
| 3,720,651 | 3/1973 | Imoto et al. | 260/78.5 R |
| 3,725,360 | 4/1973 | Adams | 260/78.5 R |

FOREIGN PATENTS OR APPLICATIONS

| | | | |
|---|---|---|---|
| 750,988 | 1/1967 | Canada | 260/78.5 R |
| 242,361 | 9/1965 | Austria | 260/78.5 R |

*Primary Examiner*—Joseph L. Schofer
*Assistant Examiner*—John Kight
*Attorney, Agent, or Firm*—Kaufman & Kramer

[57] ABSTRACT

A method of producing olefin-unsaturated acid copolymer wherein an olefin and an unsaturated acid anhydride are polymerized in the presence of a radical type polymerization catalyst, the improvement which comprises incorporating into the polymerization reaction mixture, an effective amount of a molecular weight lowering agent selected from the group consisting of (1) Groups I–IV metal salts, hydroxides or oxides; and (2) compounds having amine or ammonium groups, whereby the molecular weight of the copolymer is lowered.

18 Claims, No Drawings

METHOD FOR PRODUCING COPOLYMERS

This application is a continuation-in-part of application Ser. No. 271,469, filed July 13, 1972, now abandoned.

The present invention relates to a method for producing a copolymer of an olefin (or olefins) and an unsaturated dicarboxylic acid anhydride.

It is known that olefins such as isobutene and a gaseous mixture of isobutene and butene-1 and/or butene-2 (sometimes termed "return BB") which is obtained by extracting butadiene from naphtha-decomposed products which involve various hydrocarbons having four carbons, can be copolymerized in bulk or in an inert solvent with unsaturated anhydrides, using a radical type polymerization catalyst such as a peroxide and/or an azo-compound. As is well known in a conventional polymerization, the molecular weight of the resultant copolymers is dependent upon various polymerization conditions such as polymerization temperature, monomer concentration, amount of catalyst, molar ratio of olefin to anhydride, and the like. The lower the polymerization temperature is, the higher the monomer concentration, the higher the molar ratio of olefin to anhydride, and the smaller the amount of catalyst added, the higher is the molecular weight of the product copolymer.

Among the various above-mentioned factors, polymerization temperature affects predominantly molecular weight of copolymer. However, the range of molecular weights of the copolymer is limited, for example, $[\eta]$ (intrinsic viscosity measured in dimethyl formamide at 30°C.) of a copolymer of isobutene and maleic anhydride ranges between 0.9 to 1.8, and $[\eta]$ of a copolymer of "return BB" and maleic anhydride, between 0.4 and 0.8. Generally speaking, any copolymer of desired molecular weight is hardly produced by conventional methods, and also very laborious operations are required to set up and change polymerization conditions in order to produce a copolymer of desired molecular weight.

The present inventors have conducted studies to solve the above problems and to develop a simple and suitable method for obtaining an olefin-unsaturated acid anhydride copolymer of desired molecular weight without any need to change polymerization conditions, and they have found a novel method in which a copolymer of desired molecular weight can be synthesized by polymerizing a copolymer using a very small amount of one type or more than one type of compound selected from the group consisting of compounds having amine or ammonium groups, and salts, hydroxides and oxides of metals which belong in Group I, Group II, Group III and Group IV in the Periodic Table, as a molecular weight lowering agent. Use of these compounds avoids the need to change polymerization conditions such as polymerization temperature, monomer concentration, molar ratio of polymerizable reactants and amount of catalyst, and type of polymerization solvent.

According to the present invention, any copolymer having desired molecular weight can be readily produced by selecting the type and the amount of molecular weight lowering agent used, without bringing about any change in structure of the copolymer. For example, a copolymer of desired molecular weight, whose $[\eta]$ is in wide range between 0.1 and 2.5, can be produced very easily by the present method.

Salts, hydroxides and oxides of metals which belong in Group I, Group II, Group III and Group IV in the Periodic Table, used as molecular weight lowering agents for the present invention are for example, sodium carbonate, sodium acetate, sodium sulfate, sodium oxalate, sodium maleate, potassium carbonate, potassium acetate, potassium nitrate, copper nitrate, cuprous chloride, sodium hydroxide, potassium hydroxide, magnesium chloride, calcium chloride, calcium nitrate, zinc acetate, calcium hydroxide, aluminum chloride, aluminum acetate, aluminum hydroxide, aluminum oxide and stannous chloride.

Compounds having amine or ammonium groups suitable as molecular weight lowering agents for the present method are primary, secondary, tertiary aliphatic amines; primary and secondary aromatic amines; carboxamides; and acid or quaternary salts thereof such as for example organic amines such as triethyl amine, diethyl amine, methylene diamine, ethyl amine, and aniline, inorganic amines such as hydroxylamine hydrochloride, ammonium salts of organic acids such as ammonium acetate, and amides such as acetamide and urea and the like. These molecular weight lowering agents may be used alone or in admixture with each other.

These molecular weight lowering agents decrease molecular weight of a copolymer to a desired extent. Generally, reduction in molecular weight becomes larger with increase in the amount of the agent.

The choice of amount of molecular weight lowering agents should be made dependent upon type of the agent used and the desired molecular weight of copolymer, but not less than 0.001 percent, and preferably 0.001 to 1 percent, based on weight of the anhydride, is usually employed.

In the present invention there is no limitation in selection of polymerization solvent used, but most suitable solvents are those which dissolve reactant monomers (anhydrides and olefins) but are not solvents for the copolymer product. Suitable solvents for the present invention are acetic acid esters such as iso-propyl acetate, mixed solvents of ethyl acetate (60 to 90 percent, by weight) and butanol (40 to 10 percent, by weight), mixed solvents of ethyl acetate and cyclohexane, mixed solvents of methyl acetate and n-hexane, benzene and dioxane. Among these solvents, iso-propyl acetate and mixed solvents of ethyl acetate and tert-butanol are preferably employed.

Polymerization catalysts used for the present invention are azo-compounds such as azo-iso-butylonitrile and 2,2'-azo-bis-(2,4-dimethyl valeronitrile), peroxides such as benzoyl peroxides and other free radical type polymerization catalysts. The concentration of catalyst required for the polymerization is in the range of 0.05 to 3.0 moles of catalyst based on the molar amount of the anhydride. The total amount of catalyst may be added at one time to reaction system in the beginning stage of polymerization. Also, catalyst may be added stepwise in the course of polymerization.

Polymerization is performed at 20° to 90°C., more preferably at 45° to 85°C. Polymerization pressure (absolute value) used should be in the range of 1 to 9 kg/cm$^2$, preferably 3 to 5 kg/cm$^2$, and polymerization time used should be in the range of 1 to 15 hours, preferably 2 to 8 hours.

There is no limitation on the ratio of olefin to anhydride, and any ratio of these can be employed. However, when it is desired that the reaction product have a high content of anhydride moiety, the molar ratio of olefin to anhydride is selected to be preferably more than 1.

Preferably, the amounts of monomers (the total amount of olefins and anhydride) are used in the range of 10 to 35 percent, based on the total weight of polymerizing mixture. The concentration of copolymer produced is preferably controlled to 8 to 40 percent by weight.

Any copolymer having desired molecular weight can be obtained by selecting type and amount of molecular weight lowering agent and other polymerization conditions, without bringing about any change in fine structure of the copolymer produced.

The present method is suitably employed in forming copolymers of olefins of 2–8 carbons and any unsaturated anhydrides. Among such anhydrides are aliphatic unsaturated anhydrides such as itaconic acid anhydride, fumaric acid anhydride and maleic acid anhydride. Among the useful olefins are propene, butene-1, butene-2, pentene-2, hexene-1, and the like. The process is especially useful for producing copolymers of $C_4$ olefins such as isobutene as return BB, and maleic anhydride.

The present method is suitable for the polymerization system in which the polymer produced is separated out as precipitant, for example, precipitation polymerization using isopropyl acetate or mixture of ethyl acetate and tert-butanol as a solvent. Furthermore, this precipitation polymerization method has an advantage in that the copolymer is produced as a homogeneous fine powder of large particle size.

By way of further illustration, the following examples are given in which all parts are by weight. Molecular weights of copolymers are represented by intrinsic viscosity $[\eta]$ (measured in dimethylformamide at 30°C.) which is used commonly as an index of average molecular weight.

EXAMPLE 1

To a 1 liter autoclave, equipped with a stirrer, 421 parts of mixed solvent of 75 percent, by weight, ethyl acetate and 25 percent, by weight, tert-butanol (hereinafter, referred, to as a mixed solvent of ethyl acetate-t-butanol), 60 parts of maleic anhydride (hereinafter referred to as MAA), 1 part of $\alpha,\alpha'$-azo-bis-isobutylonitrile (hereinafter referred to as AIBN) and 0.3 part of calcium chloride were added, and the gaseous space in the vessel was replaced by nitrogen gas, followed by adding further 51.5 parts of isobutene.

Polymerization was performed at 65°C. inside of the vessel with continuous stirring. After the reaction for 6 hours, the vessel was evacuated and a slurry-like polymerization product was taken out of the vessel, filtered and dried. 75 parts of copolymer were obtained having $[\eta] = 0.524$.

Reference Example 1

To a 1 liter autoclave, equipped with a stirrer, 421 parts of mixed solvent of ethyl acetate-t-butanol, 60 parts of MAA and 1 part of AIBN were added, and the gaseous space of the vessel was replaced by nitrogen gas, followed by adding 51.5 parts of isobutene.

Following the same procedure as in Example 1, 93.3 parts of copolymer having $[\eta] = 1.574$ were obtained.

EXAMPLE 2

To a 1 liter autoclave, equipped with a stirrer, 421 parts of mixed solvent consisting of 80 percent, by weight, ethyl acetate and 20 percent, by weight, cyclohexane, 60 parts of MAA, 1 part of AIBN and 0.3 part of magnesium chloride were added and the gaseous space in the vessel was replaced by nitrogen gas, followed by adding 51.5 parts of isobutene.

Following the same procedure as in Example 1, 81.4 parts of copolymer having $[\eta] = 0.636$ were obtained.

EXAMPLE 3

To a 1 liter autoclave, equipped with a stirrer, 421 parts of mixed solvent of ethyl acetate-t-butanol, 60 parts of MAA, 1 part of AIBN and 0.3 part of urea were added and the gaseous space of the vessel was replaced by nitrogen gas, followed by adding 51.5 parts of isobutene.

Following the same procedure as in Example 1, 93.2 parts of copolymer having $[\eta] = 0.781$ were obtained.

EXAMPLE 4

Example 1 was repeated but calcium chloride used as a molecular weight lowering agent was replaced by different agents. The results are set out in Table I.

TABLE I

| Example No. | Molecular Weight Lowering Agent | $[\eta]$ of Copolymer Produced | Yield of Copolymer (parts) |
| --- | --- | --- | --- |
| 4 - 1 | NaOH | 0.484 | 80.8 |
| 4 - 2 | $Na_2SO_4$ | 1.407 | 93.3 |
| 4 - 3 | $NaNO_3$ | 1.056 | 93.4 |
| 4 - 4 | $NaNO_2$ | 0.620 | 93.1 |
| 4 - 5 | $Na_2CO_3$ | 0.643 | 93.5 |
| 4 - 6 | $NaHCO_3$ | 0.919 | 93.3 |
| 4 - 7 | $NaHSO_3$ | 0.752 | 93.3 |
| 4 - 8 | $Na_2HPO_4$ | 0.674 | 92.5 |
| 4 - 9 | NaBr | 1.198 | 93.7 |
| 4 - 10 | NaF | 0.795 | 93.5 |
| 4 - 11 | $Na_2SiO_3$ | 0.804 | 92.9 |
| 4 - 12 | $Na_2B_4O_7$ | 0.457 | 81.4 |
| 4 - 13 | $NaClO_3$ | 1.321 | 93.7 |
| 4 - 14 | HCOONa | 0.578 | 84.5 |
| 4 - 15 | $CH_3COONa$ | 0.590 | 92.3 |
| 4 - 16 | $(COONa)_2$ | 1.167 | 93.6 |
| 4 - 17 | $(CH=COONa)_2$ | 0.644 | 93.5 |
| 4 - 18 | KOH | 0.557 | 92.0 |
| 4 - 19 | KCl | 1.474 | 93.3 |
| 4 - 20 | $KNO_3$ | 0.675 | 93.2 |
| 4 - 21 | KBr | 1.174 | 93.6 |
| 4 - 22 | $K_2CO_3$ | 0.856 | 93.3 |
| 4 - 23 | $KH_2PO_4$ | 1.031 | 93.7 |
| 4 - 24 | $CH_3COOK$ | 0.454 | 75.2 |
| 4 - 25 | $Ca(OH)_2$ | 1.428 | 93.5 |
| 4 - 26 | $Ca(NO_3)_2$ | 1.077 | 76.0 |
| 4 - 27 | $Al(OH)_3$ | 1.404 | 93.4 |
| 4 - 28 | $AlCl_3$ | 1.098 | 93.6 |
| 4 - 29 | $Al_2O_3$ | 1.349 | 93.7 |
| 4 - 30 | $Al(OH)(CH_3COO)_2$ | 0.700 | 93.2 |
| 4 - 31 | $CuSO_4$ | 1.410 | 93.5 |
| 4 - 32 | $Cu(NO_3)_2$ | 0.709 | 72.4 |
| 4 - 33 | $CuCl_2$ | 1.428 | 93.6 |
| 4 - 34 | $SnCl_2$ | 1.152 | 85.8 |
| 4 - 35 | $Zn(CH_3COO)_2$ | 1.135 | 93.5 |
| 4 - 36 | $NH_4Cl$ | 1.333 | 93.3 |
| 4 - 37 | $CH_3COOH_4$ | 1.208 | 92.7 |
| 4 - 38 | $NH_2OH \cdot HCl$ | 0.997 | 91.0 |
| 4 - 39 | $C_2H_5NH_2$ | 1.33 | 93.2 |
| 4 - 40 | $(CH_3)_2CHNH_2$ | 1.281 | 92.9 |
| 4 - 41 | $(C_2H_5)_2NH$ | 0.954 | 93.2 |
| 4 - 42 | $(C_2H_5)_3N$ | 0.193 | 45.0 |
| 4 - 43 | $CH_3CONH_2$ | 1.286 | 93.6 |
| 4 - 44 | $C_6H_5NH_2$ | 1.155 | 90.4 |

EXAMPLE 5

Following the same procedure as in Example 1, polymerization experiments were performed varying type and amount of molecular weight lowering agent. The results are shown in Table II.

TABLE II

| Example No. | Molecular Weight Lowering Agent | Modifier Added | $[\eta]$ of Copolymer Produced | Yield of Copolymer (Parts) |
| --- | --- | --- | --- | --- |
| 5 - 1 | CaCl$_2$ | 0.033%/MAA | 1.437 | 88.2 |
| 5 - 2 | CaCl$_2$ | 0.167%/MAA | 0.832 | 87.2 |
| 5 - 3 | CuCl$_2$ | 0.333%/MAA | 0.709 | 74.5 |
| 5 - 4 | KNO$_3$ | 0.0038%/MAA | 1.273 | 88.3 |
| 5 - 5 | KNO$_3$ | 0.033%/MAA | 0.878 | 82.9 |
| 5 - 6 | KNO$_3$ | 0.167%/MAA | 0.725 | 82.9 |

EXAMPLE 6

To a 1 liter autoclave, equipped with a stirrer, 633.9 parts of mixed solvent consisting of 70 percent, by weight, methyl acetate and 30 percent, by weight, n-hexane, 45 parts of MAA, 0.2 part of AIBN and 0.15 part of calcium chloride were added, and the gaseous space in the vessel was replaced by nitrogen gas, followed by adding 28.5 parts of isobutene. Polymerization was performed at 85°C. inside of the vessel with continuous stirring. After the reaction for 5 hours, the vessel was evacuated and slurry-like polymerization product was taken out of the vessel, filtered out and dried to give 67.5 parts of copolymer having $[\eta] = 0.304$.

Reference Example 2

To a 1 liter autoclave, equipped with a stirrer, 633.9 parts of mixed solvent consisting of 70 percent, by weight, methyl acetate and 30 percent, by weight, n-hexane, 45 parts of MAA and 0.2 part of AIBN were added, and the gaseous space in the vessel was replaced by nitrogen gas, followed by adding further 28.5 parts of isobutene.

Following the same procedure as in Example 6, 69.6 parts of copolymer having $[\eta] = 0.826$ were obtained.

EXAMPLE 7

To a 1 liter autoclave, equipped with a stirrer, 421 parts of isopropyl acetate, 60 parts of MAA, 1 part of AIBN and 0.3 part of urea were added and the gaseous space in the vessel was replaced by nitrogen gas, followed by adding 51.5 parts of isobutene.

Polymerization was performed at 65°C. inside of the vessel with continuous stirring. After the reaction for 6 hours, the vessel was evacuated and slurry-like polymerization product was taken out, filtered out and dried to give 83 parts of copolymer having $[\eta] = 0.555$.

Reference Example 3

To a 1 liter autoclave equipped with a stirrer, 421 parts of isopropyl acetate, 60 parts of MAA and 1 part of AIBN were added and the gaseous space in the vessel was replaced by nitrogen gas.

Following the same procedure as in Example 7, 93.5 parts of copolymer having $[\eta] = 1.712$ were obtained.

EXAMPLE 8

To a 1 liter autoclave, equipped with a stirrer, 421 parts of mixed solvent consisting of 90 percent, by weight, isopropyl acetate and 10 percent, by weight, n-hexane, 60 parts of MAA, 1 part of AIBN and 0.3 part of calcium chloride were added and the gaseous space in the vessel was replaced by nitrogen gas, following by adding 51.5 parts of isobutene.

Polymerization was performed at 65°C. inside of the vessel. After the reaction for 6 hours, the vessel was evacuated and slurry-like polymerization product was taken out, filtered out and dried to give 83.5 parts copolymer having $[\eta] = 0.615$.

Reference Example 4

To a 1 liter autoclave equipped with a stirrer, 421 parts of mixed solvent consisting of 90 percent, by weight, isopropyl acetate and 10 percent, by weight, n-hexane, 60 parts of MAA and 1 part of AIBN were added, and the gaseous space in the vessel was replaced by nitrogen gas, followed by adding 51.5 parts of isobutene. Following the same procedure as in Example 8, 92.8 parts of copolymer having $[\eta] = 1.644$ were obtained.

EXAMPLE 9

To a 1 liter autoclave equipped with a stirrer, 421 parts of mixed solvent of ethyl acetate-t-butanol, 60 parts of MAA, 1 part of AIBN, 0.034 part of calcium chloride and 0.0735 part of urea were added, and the gaseous space in the vessel was replaced by nitrogen gas, followed by adding 51.5 parts of isobutene.

Following the same procedure as in Example 1, 85 parts of copolymer having $[\eta] = 0.665$ were obtained.

EXAMPLE 10

To a 1 liter autoclave equipped with a stirrer, 421 parts of mixed solvent consisting of 70 percent, by weight, methyl acetate and 30 percent, by weight, cyclohexane, 60 parts of MAA, 1 part of AIBN, 0.034 part of calcium chloride and 0.117 part of magnesium chloride were added and the gaseous space in the vessel was replaced by nitrogen gas, followed by adding 51.5 parts of isobutene.

Following the same procedure as in Example 1, 76.4 parts of copolymer having $[\eta] = 0.630$ were obtained.

EXAMPLE 11

To a 1 liter autoclave, 383.1 parts of mixed solvent of ethyl acetate-t-butanol, 60 parts of MAA, 1 part of AIBN and 0.148 part of urea were added, and the gaseous space in the vessel was replaced by nitrogen gas, followed by adding 95.8 parts of "return BB" (composition: 43.5 percent isobutene, 26.4 percent butene-1, 18.3 percent butene-2, 9.3 percent n-butene, 2.2 percent isobutane and 0.2 percent others).

Following the same procedure as in Example 1, 93.5 parts of copolymer having $[\eta] = 0.350$ were obtained.

Reference Example 5

To a 1 liter autoclave, 383.1 parts of mixed solvent of ethyl acetate-t-butanol, 60 parts of MAA and 1 part of AIBN were added and the gaseous space in the vessel was replaced by nitrogen gas, followed by adding 95.8 parts of "return BB" having the same composition as in Example 11.

Following the same procedure as in Example 11, 92.0 parts of copolymer having $[\eta] = 0.599$ were obtained.

EXAMPLE 12

To a 1 liter autoclave, equipped with a stirrer, 383.1 parts of benzene, 60 parts of MAA, 1 part of AIBN and 0.204 part of calcium chloride were added and the gaseous space in the vessel was replaced by nitorgen gas, followed by adding 95.8 parts of "return BB" having the same composition as in Example 11.

Following the same procedure as in Example 11, 87.3 parts of copolymer having $[\eta] = 0.321$ were obtained.

Reference Example 6

To a 1 liter autoclave equipped with a stirrer, 460.8 parts of dioxane, 90 parts of MAA and 1 part of AIBN were added and the gaseous space in the vessel was replaced by nitrogen gas, followed by adding 77.2 parts of isobutene.

Following the same procedure as in Example 11, 135 parts of copolymer having $[\eta] = 1.850$ were obtained.

What is claimed is:

1. In the method of producing an olefin-unsaturated acid anhydride copolymer wherein an olefin and an unsaturated acid anhydride are polymerized in the presence of a radical type polymerization catalyst in a solvent which dissolves reactant monomers but does not dissolve the copolymer products substantially,
 the improvement which comprises incorporating into the polymerization reaction mixture, an effective amount, not less than 0.001 percent of the weight of the unsaturated acid anhydride, of a molecular weight lowering agent selected from the group consisting of
 1. Groups I to IV metal salts, hydroxides or oxides, and
 2. compounds having primary, secondary or tertiary aliphatic amine, primary or secondary aromatic amine or ammonium groups, whereby the molecular weight of the copolymer is lowered.

2. The method of claim 1 wherein the anhydride is maleic acid anhydride.

3. The method of claim 1 wherein the olefin is a $C_4$ hydrocarbon.

4. In the method of producing an olefin-unsaturated acid anhydride copolymer wherein an olefin and an unsaturated aliphatic acid anhydride are polymerized in the presence of a radical type polymerization catalyst and a solvent which dissolves reactant monomers but does not dissolve the copolymer products substantially,
 the improvement which comprises incorporating into the polymerization reaction mixture an effective amount, not less than 0.001 percent based on the weight of the anhydride, of a molecular weight lowering agent selected from the group consisting of Groups I to IV metal salts, hydroxides or oxides, whereby the molecular weight of the copolymer is lowered.

5. The method of claim 4 wherein the anhydride is maleic acid anhydride.

6. The method of claim 4 wherein the olefin is a $C_4$ hydrocarbon.

7. The method of claim 4 wherein the agent is an hydroxide.

8. The method of claim 4 wherein the agent is an oxide.

9. In the method of producing an olefin-unsaturated acid anhydride copolymer wherein an olefin and unsaturated acid anhydride are polymerized in the presence of a radical type polymerization catalyst and a solvent which dissolves reactant monomers but does not dissolve product polymers substantially,
 the improvement which comprises incorporating into the polymerization reaction mixture, an effective amount not less than 0.001 percent of the weight of the anhydride, of a molecular weight lowering agent selected from the group consisting of compounds having primary, secondary or tertiary aliphatic amine, primary or secondary aromatic amine or ammonium groups, whereby the molecular weight of the copolymer is lowered.

10. The method of claim 9 wherein the molecular weight lowering agent is a member selected from the group consisting of primary, secondary or tertiary aliphatic amine.

11. The method of claim 9 wherein the molecular weight lowering agent is an amide.

12. The method of claim 9 wherein the molecular weight lowering agent is an ammonium salt of a carboxylic acid.

13. In the method of producing an olefin-unsaturated acid anhydride copolymer wherein an olefin and an unsaturated acid anhydride are polymerized in the presence of a radical type polymerization catalyst, in a solvent which dissolves reactant monomers but does not dissolve the copolymer product substantially,
 the improvement which comprises incorporating into the polymerization reaction mixture, an effective amount not less than 0.001 percent based on the weight of the anhydride, of a molecular weight lowering agent selected from the group consisting of sodium carbonate, sodium acetate, sodium sulfate, sodium oxalate, sodium maleate, potassium carbonate, potassium acetate, potassium nitrate, copper nitrate, cuprous chloride, sodium hydroxide, potassium hydroxide, magnesium chloride, calcium chloride, calcium nitrate, zinc acetate, calcium hydroxide, aluminum chloride, aluminum acetate, aluminum hydroxide, aluminum oxide and stannous chloride, whereby the molecular weight of the copolymer is lowered.

14. The method of claim 9 wherein the molecular weight lowering agent is a member selected from the group consisting of triethyl amine, diethyl amine, methylene diamine, ethyl amine, aniline, hydroxylamine hydrochloride, ammonium acetate, acetamide and urea.

15. The method of claim 9 wherein the molecular weight lowering agent is urea.

16. The method of claim 13 wherein the solvent is a member selected from the group consisting of (1) isopropyl acetate, (2) a mixed solvent of isopropyl acetate and n-hexane, (3) a mixed solvent of ethyl acetate and tert-butanol, (4) a mixed solvent of ethyl acetate and cyclohexane, (5) a mixed solvent of methyl acetate and n-hexane, (6) benzene and (7) dioxane.

17. The method of claim 16 wherein the solvent is isopropyl acetate.

18. The method of claim 16 wherein the solvent is a mixed solvent of 60 to 90 weight percent of ethyl acetate and 40 to 10 weight percent of tert-butanol.

* * * * *